(12) United States Patent
Yamazaki et al.

(10) Patent No.: US 9,543,875 B2
(45) Date of Patent: Jan. 10, 2017

(54) MOTOR CONTROL DEVICE, AND METHOD AND DEVICE FOR ESTIMATING MAGNETIC FLUX OF ELECTRIC MOTOR

(71) Applicant: KABUSHIKI KAISHA YASKAWA DENKI, Kitakyushu-shi (JP)

(72) Inventors: Akira Yamazaki, Kitakyushu (JP); Shingo Fukumaru, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 26 days.

(21) Appl. No.: 14/811,788

(22) Filed: Jul. 28, 2015

(65) Prior Publication Data

US 2016/0036364 A1   Feb. 4, 2016

(30) Foreign Application Priority Data

Jul. 29, 2014 (JP) ................... 2014-154075

(51) Int. Cl.
*H02P 21/00* (2016.01)
*H02P 21/12* (2016.01)
*H02P 21/14* (2016.01)

(52) U.S. Cl.
CPC ............. *H02P 21/12* (2013.01); *H02P 21/141* (2013.01)

(58) Field of Classification Search
CPC ....... G05B 19/404; G05B 19/19; G05B 19/33; H02P 21/06; H02P 21/146
USPC .................... 318/400.02, 632, 638
See application file for complete search history.

(56) References Cited

U.S. PATENT DOCUMENTS

| 7,504,797 B2 * | 3/2009 | Tomigashi | H02P 21/18 318/727 |
|---|---|---|---|
| 2009/0251083 A1 | 10/2009 | Kinpara et al. | |
| 2010/0194329 A1* | 8/2010 | Lu | H02P 21/16 318/798 |
| 2011/0309781 A1* | 12/2011 | Tomigashi | H02P 21/13 318/504 |
| 2012/0268046 A1 | 10/2012 | Yamazaki et al. | |
| 2013/0015704 A1* | 1/2013 | Tsai | H02J 9/062 307/23 |

FOREIGN PATENT DOCUMENTS

JP   2012-228083   11/2012

OTHER PUBLICATIONS

Extended European Search Report for corresponding EP Application No. 15178774.4-1806, Mar. 10, 2016.

* cited by examiner

*Primary Examiner* — Rina Duda
(74) *Attorney, Agent, or Firm* — Mori & Ward, LLP

(57) ABSTRACT

A motor control device is provided, which includes a power converter for applying output voltage according to a voltage command to an electric motor, a magnetic flux estimator for estimating a vector of stator magnetic flux of the electric motor based on a difference between the output voltage and a voltage drop caused by a coil resistance of the electric motor, and a phase estimator for estimating a phase of the stator magnetic flux based on the vector of the stator magnetic flux estimated by the magnetic flux estimator. The magnetic flux estimator includes a variable low-pass filter for applying a low-pass filter to the difference at a cut-off frequency according to a frequency of the output voltage, and a phase adjuster for retarding at least one of an output phase of the variable low-pass filter and a phase of the difference before inputted into the variable low-pass filter.

9 Claims, 9 Drawing Sheets

MOTOR CONTROL DEVICE, AND METHOD AND DEVICE FOR ESTIMATING MAGNETIC FLUX OF ELECTRIC MOTOR

CROSS-REFERENCE TO RELATED APPLICATION

The application claims priority under 35 U.S.C. §119 to Japanese Patent Application No. 2014-154075, which was filed on Jul. 29, 2014, the entire disclosure of which is hereby incorporated by reference.

TECHNICAL FIELD

The disclosed embodiment relates to a motor control device, and a method and device for estimating a magnetic flux of an electric motor.

BACKGROUND

It is known that control devices which drive electric motors, such as synchronous motors and induction motors without any position sensors. For example, JP2012-228083A discloses a technique to estimate a stator magnetic flux of an electric motor based on current and voltage of the electric motor. The electric motor is controlled based on the estimated stator magnetic flux.

SUMMARY

According to one mode of the disclosed embodiment, a motor control device is provided, which includes a power converter for applying output voltage according to a voltage command to an electric motor, a magnetic flux estimator for estimating a vector of stator magnetic flux of the electric motor based on a difference between the output voltage and a voltage drop caused by a coil resistance of the electric motor, and a phase estimator for estimating a phase of the stator magnetic flux based on the vector of the stator magnetic flux estimated by the magnetic flux estimator. The magnetic flux estimator includes a variable low-pass filter for applying a low-pass filter to the difference at a cut-off frequency according to a frequency of the output voltage, and a phase adjuster for retarding at least one of an output phase of the variable low-pass filter and a phase of the difference before inputted into the variable low-pass filter.

The variable low-pass filter may further set the frequency of the output voltage as the cut-off frequency, while the phase adjuster may retard at least one of the output phase and the phase of the difference by $\pi/4$.

The motor control device may further include a velocity estimator for estimating velocity of the electric motor based on the vector of the stator magnetic flux estimated by the magnetic flux estimator, a velocity controller for generating a torque command so that the estimated velocity is in agreement with the velocity command, and an outputter for outputting the velocity command when the velocity of the electric motor is less than a predetermined first velocity, and outputting the estimated velocity when the velocity of the electric motor is greater than a predetermined second velocity that is greater than the first velocity. The variable low-pass filter may set a frequency according to the output of the outputter as the cut-off frequency.

The outputter may sum the velocity command and the estimated velocity with weights when the velocity of the electric motor is greater than the first velocity and smaller than the second velocity, and output the added result, the weight of the estimated velocity being greater than the weight of the velocity command according to an increase in the velocity of the electric motor.

The magnetic flux estimator may include a fixed low-pass filter for applying a low-pass filter to the difference at a fixed cut-off frequency, and a compensator for compensating based on an output of the fixed low-pass filter, the estimated value of the vector of the stator magnetic flux based on an output of the phase adjuster.

The motor control device may further include a current distributor for calculating based on a torque command, a component that contributes to a mechanical output of the electric motor as a $\delta$-axis current command and a component that does not contribute to the mechanical output as a $\gamma$-axis current command, a current detector for detecting current flowing into the electric motor, a converter for converting the detected current of the current detector into $\delta$-axis current and $\gamma$-axis current based on the phase of the stator magnetic flux estimated by the phase estimator, and a current controller for generating a $\delta$-axis voltage command and a $\gamma$-axis voltage command as the voltage commands so that a difference between the $\delta$-axis current command and the $\delta$-axis current and a difference between the $\gamma$-axis current command and the $\gamma$-axis current become zero, respectively. Further, the phase estimator may estimate the phase of the stator magnetic flux so that a $\delta$-axis component of the vector of the stator magnetic flux estimated by the magnetic flux estimator becomes zero.

The motor control device may further include a converter for converting the detected current of the current detector into an $\alpha$-axis component and a $\beta$-axis component in a stationary coordinate system, and a converter for converting the voltage command into an $\alpha$-axis component and a $\beta$-axis component in the stationary coordinate system. The magnetic flux estimator may estimate the vector of the stator magnetic flux based on the coil resistance, the $\alpha$-axis component and the $\beta$-axis component of the detected current, and the $\alpha$-axis component and the $\beta$-axis component of the voltage command.

According to another mode of the disclosed embodiment, a magnetic flux estimating device of an electric motor is provided. The magnetic flux estimating device includes a variable low-pass filter for applying a low-pass filter to a difference between an applied voltage to the electric motor and a voltage drop caused by a coil resistance of the electric motor at a cut-off frequency according to a frequency of the applied voltage, and a phase adjuster for retarding at least one of an output phase of the variable low-pass filter and a phase of the difference before inputted into the variable low-pass filter.

According to still another mode of the disclosed embodiment, a method of estimating a magnetic flux of an electric motor is provided. The method of estimating the magnetic flux includes applying a low-pass filter to a difference between an applied voltage to the electric motor and a voltage drop caused by a coil resistance of the electric motor at a cut-off frequency according to a frequency of the applied voltage, and retarding at least one of a phase of the difference after the low-pass filter is applied and a phase of the difference before the low-pass filter is applied.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, one embodiment of a motor control device, and a method and device for estimating a magnetic flux of an electric motor according to the present disclosure is described in detail with reference to the accompanying drawings. Note that the present disclosure is not limited by the embodiment described below.

1. Motor Control Device

Figure 1:
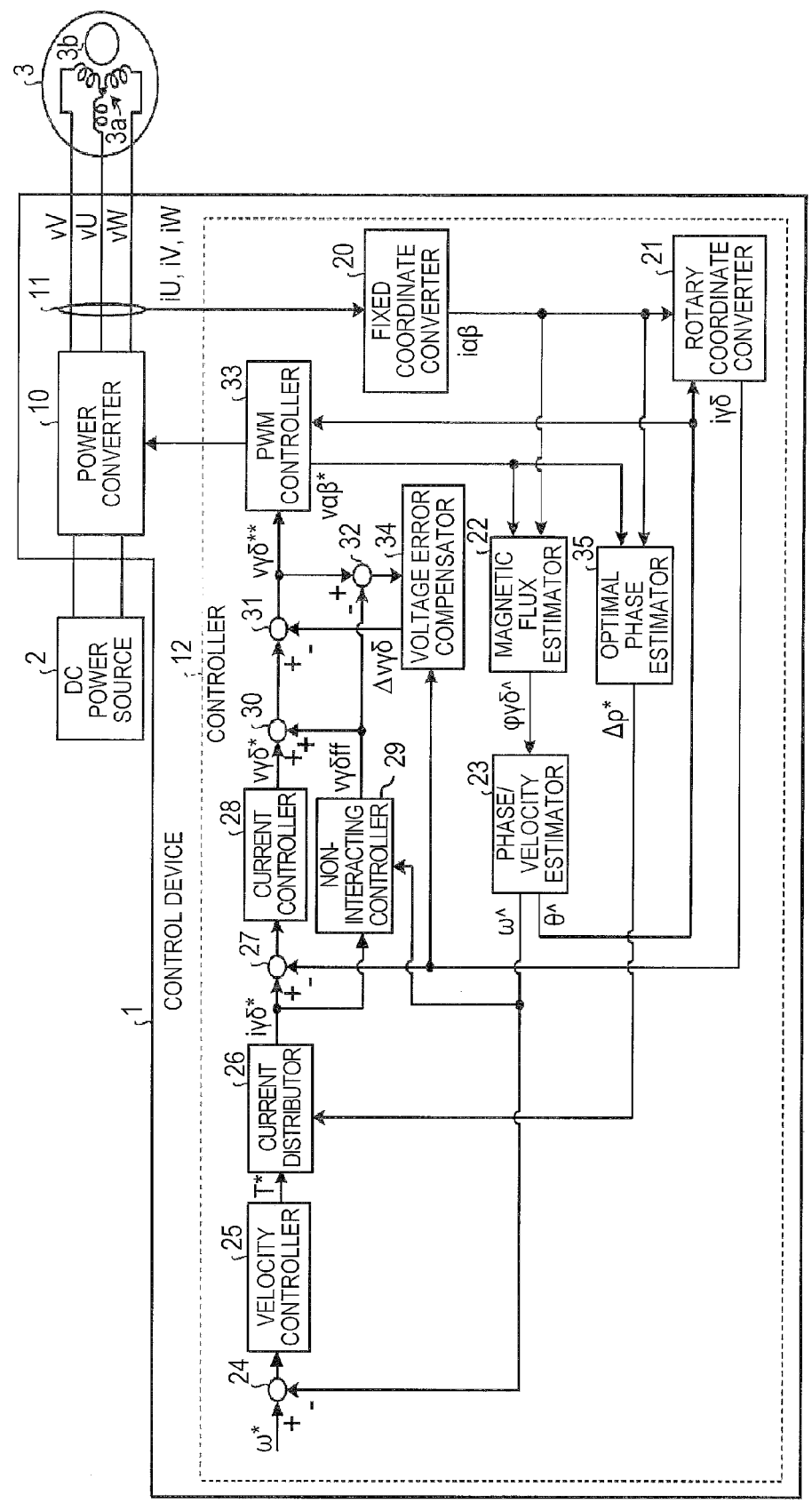
FIG. 1 is a view illustrating an example configuration of a motor control device according to one embodiment.

FIG. 1 is a view illustrating an example configuration of a motor control device 1 according to one embodiment of the present disclosure. As illustrated in FIG. 1, the control device 1 includes a power converter 10, a current detector 11, and a controller 12.

The control device 1 converts direct current (DC) voltage supplied from an external DC power source 2 by a known pulse width modulation (PWM) control into three-phase alternating current (AC) voltages $v_U$, $v_V$ and $v_W$ at desired frequency and voltage, and outputs them to an external electric motor 3. The electric motor 3 may be a permanent magnet synchronous motor (PMSM), a synchronous reluctance motor (SynRM), or an induction motor (IM), for example.

The power converter 10 includes a three-phase inverter circuit and a gate drive circuit, and is connected between the DC power source 2 and the electric motor 3, for example. The three-phase inverter circuit is comprised of six switching elements which are bridge-connected with three phases, for example. The gate drive circuit is configured to amplify a PWM signal outputted from the controller 12, and input the amplified signal into gates of the switching elements, for example. Thus, the switching elements which constitute the three-phase inverter circuit are turned on/off based on the PWM signals of the controller 12. Note that the power converter 10 may also be a three-phase inverter circuit equal to or more than three level, or a matrix converter.

The DC power source 2 may also be configured to convert AC voltage into DC voltage and output the DC voltage (e.g., a combination of a rectifier circuit with diodes and a smoothing capacitor for smoothing the DC output voltage). In this case, an AC power source is connected to the inputs of the rectifier circuit.

The current detector 11 detects currents which flow between the power converter 10 and the electric motor 3. Particularly, the current detector 11 detects instantaneous values $i_U$, $i_V$ and $i_W$ of current which flows between the power converter 10 and U-, V- and W-phases of the electric motor 3, respectively (hereinafter and in the drawings, referred to as "the output currents $i_U$, $i_V$ and $i_W$"). Note that the current detector 11 detects currents using Hall devices which are magnetoelectric transducers, for example.

The controller 12 generates PWM signals based on the output currents $i_U$, $i_V$ and $i_W$ detected by the current detector 11, and a velocity command $\omega^*$, and outputs them to the power converter 10. The power converter 10 outputs, based on the PWM signals from the controller 12, three-phase AC voltages $v_U$, $v_V$ and $v_W$ (hereinafter and in the drawings, may be referred to as "the output voltage $v_{UVW}$") to the U-, V- and W-phases of the electric motor 3.

The controller 12 uses, as control axes, a γδ coordinate system in which a component which contributes to a mechanical output of the electric motor 3 is used as a δ-axis component and a component which does not contribute to the mechanical output is used as a γ-axis component, and performs a vector control while dividing the current component into the δ-axis component and the γ-axis component. Below, a configuration of the controller 12 is described in detail.

2. Controller 12

As illustrated in FIG. 1, the controller 12 includes a fixed coordinate converter 20, a rotary coordinate converter 21, a magnetic flux estimator 22, a phase/velocity estimator 23, subtractors 24, 27, 31 and 32, a velocity controller 25, a current distributor 26, a current controller 28, a non-interacting controller 29, an adder 30, a PWM controller 33, a voltage error compensator 34, and an optimal phase estimator 35.

The fixed coordinate converter 20 converts the output currents $i_U$, $i_V$ and $i_W$ into αβ-axes components of two axes which intersect perpendicularly to each other in a stationary coordinate system (fixed coordinate system) to calculate a current vector $i_{\alpha\beta}$ in an αβ coordinate system which uses α-axis current $i_\alpha$ and γ-axis current $i_\beta$ as its vector components. The αβ coordinate system is a rectangular coordinate system set up on a stator 3a of the electric motor 3, and is also referred to as "the stator coordinate system." The fixed coordinate converter 20 outputs the current vector $i_{\alpha\beta}$ to the rotary coordinate converter 21.

The rotary coordinate converter 21 converts the current vector $i_{\alpha\beta}$ in the αβ coordinate system into a current vector $i_{\gamma\delta}$ in the γδ coordinate system based on an estimated phase $\hat{\theta}$ outputted from the phase/velocity estimator 23. The current vector $i_{\gamma\delta}$ is a current vector having vector components of a δ-axis component $i_\delta$ which contributes to the mechanical output of the electric motor 3, and a γ-axis component $i_\gamma$ which does not contribute to the mechanical output of the electric motor 3. Note that the estimated phase $\hat{\theta}$ is a phase of a vector $\phi_{\gamma\delta}$ of a stator magnetic flux $\phi_S$ in the γδ coordinate system, and the stator magnetic flux $\phi_S$ is a magnetic flux of the stator 3a of the electric motor 3.

The magnetic flux estimator 22 estimates a vector $\phi_{\gamma\delta}$ of the stator magnetic flux $\phi_S$ in the γδ coordinate system based on a difference vdff between the output voltage $v_{UVW}$ from the power converter 10 to the electric motor 3, and a voltage drop caused by a coil resistance $R_S$ of the electric motor 3. The magnetic flux estimator 22 includes a variable low-pass filter and a phase adjuster, as will be described later, and, thereby, the magnetic flux estimator 22 can detect the stator magnetic flux $\phi_S$ with sufficient accuracy. Hereinafter, an estimated value of the vector $\phi_{\gamma\delta}$ of the stator magnetic flux $\phi_S$ in the γδ coordinate system is referred to as "the estimated stator magnetic flux $\phi_{\gamma\delta}\hat{}$."

The phase/velocity estimator 23 (one example of the phase estimator in the claims) estimates a velocity ω of a rotor 3b of the electric motor 3, and a phase θ of the stator magnetic flux $\phi_S$, based on the estimated stator magnetic flux $\phi_{\gamma\delta}\hat{}$. Hereinafter, the estimated value of the velocity ω of the rotor 3b is referred to as "the estimated velocity ω^."

Figure 2:
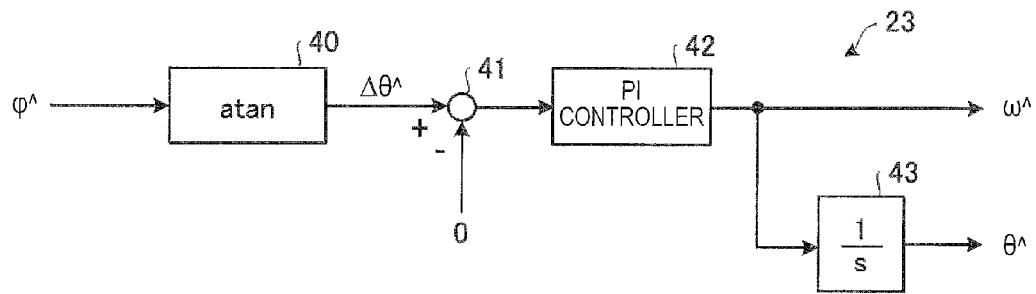
FIG. 2 is a view illustrating an example configuration of a phase/velocity estimator.

FIG. 2 is a view illustrating an example configuration of the phase/velocity estimator 23. As illustrated in FIG. 2, the phase/velocity estimator 23 includes an arctangent calculator 40, a subtractor 41, a proportional integral (PI) controller 42, and an integrator 43. The arctangent calculator 40 calculates a phase error Δθ^ based on the estimated stator magnetic flux $\phi_{\gamma\delta}\hat{}$ using the following formula (1), for example.

$$\Delta\theta^\wedge = a\tan\left(\frac{\phi\delta^\wedge}{\phi\gamma^\wedge}\right) \quad (1)$$

The subtractor 41 subtracts a predetermined value (e.g., zero) from the phase error Δθ^. The PI controller 42 calculates the estimated velocity ω^ by performing the PI control so that the subtraction result of the subtractor 41 becomes zero. The integrator 43 calculates the estimated phase θ^ by integrating the estimated velocities ω^ with respect to time. Note that the phase/velocity estimator 23 is not limited to the configuration illustrated in FIG. 2. For example, the phase/velocity estimator 23 may be provided with a PID controller that performs a proportional integral and differential (PID) control, instead of the PI controller 42.

Returning to FIG. 1, the controller 12 will further be described. The subtractor 24 subtracts the estimated velocity ω^ from the velocity command ω*, and outputs it to the velocity controller 25. The velocity controller 25 generates a torque command T* so that a difference between the velocity command ω* and the estimated velocity ω^ becomes zero. For example, the velocity controller 25 has a PI controller, and performs a PI control with respect to the difference between the velocity command ω* and the estimated velocity ω^, to generate the torque command T*.

The current distributor 26 calculates a current command vector $i_{\gamma\delta}$* having a δ-axis current command $i_\delta$* and a γ-axis current command $i_\gamma$* as vector components, based on the torque command T* and a load angle compensation value Δρ*. This configuration of the current distributor 26 is disclosed in JP2012-228083A, for example.

Figure 3:
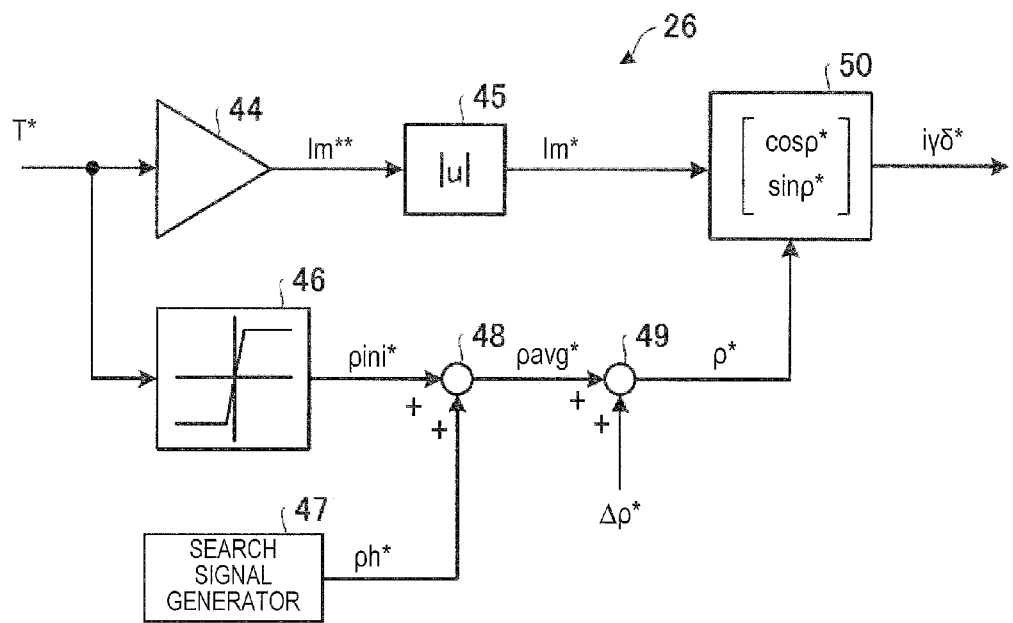
FIG. 3 is a view illustrating an example configuration of a current distributor.

FIG. 3 is a view illustrating an example configuration of the current distributor 26. As illustrated in FIG. 3, the current distributor 26 includes a command converter 44, an absolute value calculator 45, a T-to-p converter 46, a search signal generator 47, adders 48 and 49, and a distributor 50. Note that the current distributor 26 is not limited to the configuration illustrated in FIG. 3.

The command converter 44 converts the torque command T* to a current command Im** by multiplying the torque command T* by a conversion gain K. The conversion gain K is calculated based on a ratio of the rated current of the electric motor 3 to the rated torque of the electric motor 3, for example. The absolute value calculator 45 calculates a current command Im* by calculating an absolute value of the current command Im**.

The T-to-p converter 46 stores a conversion table where the torque command T* is associated with a command load angle ρ*, and converts the torque command T* into a command load angle $\rho_{ini}$* by referring to the conversion table. For example, if the electric motor 3 is a synchronous reluctance motor, the command load angle $\rho_{ini}$* is inverted in sign between power running and regeneration, and the magnitude is π/4. The command load angle $\rho_{ini}$* becomes zero in a no-load condition.

The search signal generator 47 outputs a search signal phase $\rho_h$*. The search signal phase $\rho_h$* is a phase of a minute search signal Sh at high frequency. Here, if a phase shift of the search signal Sh is $A_{mag}$ and a frequency of the search signal Sh is $\omega_h$, the search signal phase $\rho_h$* can be expressed by the following formula (2), for example.

$$\rho_h^* = A_{mag} \sin \omega_h t \quad (2)$$

The adder 48 calculates a phase $\rho_{avg}$* by adding the search signal phase $\rho_h$* to the command load angle $\rho_{ini}$*. The adder 49 adds the load angle compensation value Δρ* to the phase $\rho_{avg}$* to calculate the final command load angle ρ*.

The distributor 50 calculates the current command vector $i_{\gamma\delta}$* based on the current command Im* and the command load angle ρ*. The distributor 50 calculates the current command vector $i_{\gamma\delta}$* having the γ-axis current command $i_\gamma$* and the δ-axis current command $i_\delta$* as the vector components by the following formulas (3) and (4), for example.

$$i_\gamma^* = I_m^* \cdot \cos \rho^* \quad (3)$$

$$i_\delta^* = I_m^* \cdot \sin \rho^* \quad (4)$$

Returning to FIG. 1, the controller 12 is further described. The subtractor 27 subtracts the γ-axis current $i_\gamma$ from the γ-axis current command $i_\gamma$*, and subtracts the δ-axis current $i_\delta$ from the δ-axis current command $i_\gamma$*. For example, the current controller 28 calculates a γ-axis voltage command $v_\gamma$* by carrying out the PI control so that a deviation between the γ-axis current command $i_\gamma$* and the γ-axis current $i_\gamma$ becomes zero, and also calculates a δ-axis voltage command $v_\delta$* by carrying out the PI control so that a deviation between the δ-axis current command $i_\delta$* and the δ-axis current $i_\delta$ becomes zero.

The non-interacting controller 29 generates a γ-axis compensation voltage $v_{\gamma ff}$ and a δ-axis compensation voltage $v_{\delta ff}$ based on the γ-axis current command $i_\gamma$*, the δ-axis current command $i_\delta$*, and the estimated velocity ω^ in order to cancel a mutual interaction due to inductance between γ-axis and δ-axis, and then outputs the γ-axis compensation voltage $v_{\gamma ff}$ and the δ-axis compensation voltage $v_{\delta ff}$. The non-interacting controller 29 stores a formula or a table, and calculates the γ-axis compensation voltage $v_{\gamma ff}$ and the δ-axis compensation voltage $v_{\delta ff}$ based on the formula or table.

The adder 30 adds the γ-axis compensation voltage $v_{\gamma ff}$ to the γ-axis voltage command $v_\gamma$*, and adds the δ-axis compensation voltage $v_{\delta ff}$ to the δ-axis voltage command $v_\delta$*. The subtractor 31 generates a γ-axis voltage command $v_\gamma$** by subtracting a voltage error Δvγ from the added result of the γ-axis voltage command $v_\gamma$* and the γ-axis compensation voltage $v_{\gamma ff}$. Further, the subtractor 31 generates a δ-axis voltage command $v_\gamma$** by subtracting a voltage error Δvδ from the added result of the δ-axis voltage command $v_\delta$* and the δ-axis compensation voltage $v_{\delta ff}$. The subtractor 32 subtracts the γ-axis compensation voltage $v_{\gamma ff}$ from the γ-axis voltage command $v_\gamma^{}$, and subtracts the δ-axis compensation voltage $v_{\gamma ff}$ from the δ-axis voltage command $v_\delta^{}$.

The PWM controller 33 converts the γ-axis voltage command $v_\gamma^{}$ and the δ-axis voltage command $v_\delta^{}$ into three-phase voltage commands $v_U^*$, $v_V^*$ and $v_W^*$ based on the estimated phase $\hat{\theta}$. The PWM controller 33 generates PWM signals based on the voltage commands $v_U^*$, $v_V^*$ and $v_W^*$, and then outputs them to the power converter 10. Thus, the output voltage $v_{UVW}$ corresponding to the voltage commands $v_U^*$, $v_V^*$ and $v_W^*$ is applied from the power converter 10 to the phases U, V and W of the electric motor 3.

Further, the PWM controller 33 converts the γ-axis voltage command $v_\gamma^{}$ and the δ-axis voltage command $v_\delta^{}$ into an α-axis voltage command $v_\alpha^*$ and a β-axis voltage command $v_\beta^*$ in the αβ coordinate system based on the estimated phase $\hat{\theta}$.

The voltage error compensator 34 generates a voltage error Δv in order to reduce the unstableness of the current control responses. For example, the voltage error compensator 34 calculates the voltage error Δv so that the estimated current vector calculated by using an electric model of the electric motor 3 becomes in agreement with an error current vector of the current command vector $i_{\gamma\delta}^*$. This configuration of the voltage error compensator 34 is disclosed in JP2012-228083A, for example.

The optimal phase estimator 35 calculates the load angle compensation value Δρ* for reducing the phase error due to a resistance error, for example. This configuration of the optimal phase estimator 35 is disclosed in JP2012-228083A, for example.

Figure 4:
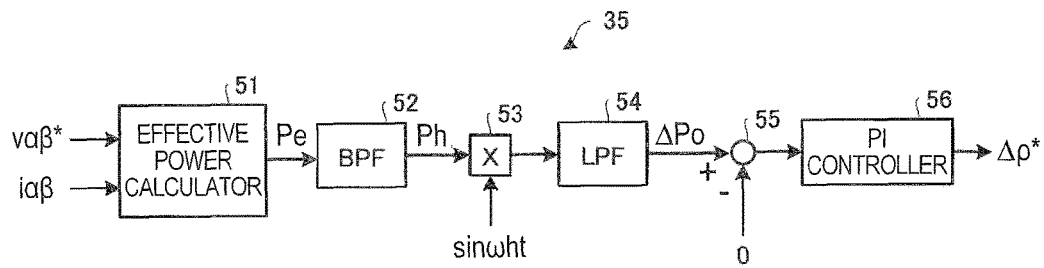
FIG. 4 is a view illustrating an example configuration of an optimal phase estimator.

FIG. 4 is a view illustrating an example configuration of the optimal phase estimator 35. As illustrated in FIG. 4, the optimal phase estimator 35 includes an effective power calculator 51, a band-pass filter (BPF) 52, a multiplier 53, a low-pass filter (LPF) 54, a subtractor 55, and a PI controller 56. The effective power calculator 51 calculates an effective power Pe by using the following formula (5) based on the α-axis voltage command $v_\alpha^*$, the β-axis voltage command $v_\beta^*$, the α-axis current $i_\alpha$, and the β-axis current $i_\beta$.

$$P_e = v_\alpha^* \cdot i_\alpha + v_\beta^* \cdot i_\beta \qquad (5)$$

The band-pass filter 52 extracts a frequency component Ph same as the frequency of the search signal Sh from the effective power Pe, and the multiplier 53 then multiplies the component Ph by a sine wave $\sin \omega_h t$. The low-pass filter 54 applies a low-pass filter to the multiplied result of the multiplier 53 to extract a fluctuation component ΔPo that depends on a variation of a mechanical output Po. The subtractor 55 subtracts zero from the fluctuation component ΔPo, and the PI controller 56 generates the phase compensation angle Δρ* so that the fluctuation component ΔPo becomes zero.

Note that, the control device 1 illustrated in FIG. 1 is provided with the voltage error compensator 34 and the optimal phase estimator 35. However, the control device 1 may not be provided with the voltage error compensator 34 and/or the optimal phase estimator 35. Additionally or alternatively, the search signal Sh may not be used. Hereinafter, an example configuration of the magnetic flux estimator 22 is described in detail.

3. Magnetic Flux Estimator 22

The magnetic flux estimator 22 applies a low-pass filter to a difference between the output voltage $v_{UVW}$ and the voltage drop caused by the coil resistance $R_S$ of the electric motor 3. Thereby, when an offset error exists in the current detector 11, an offset in the estimated stator magnetic flux $\hat{\phi}_S$ is reduced, and the estimation accuracy of the stator magnetic flux $\phi_S$ is improved.

Figure 5:
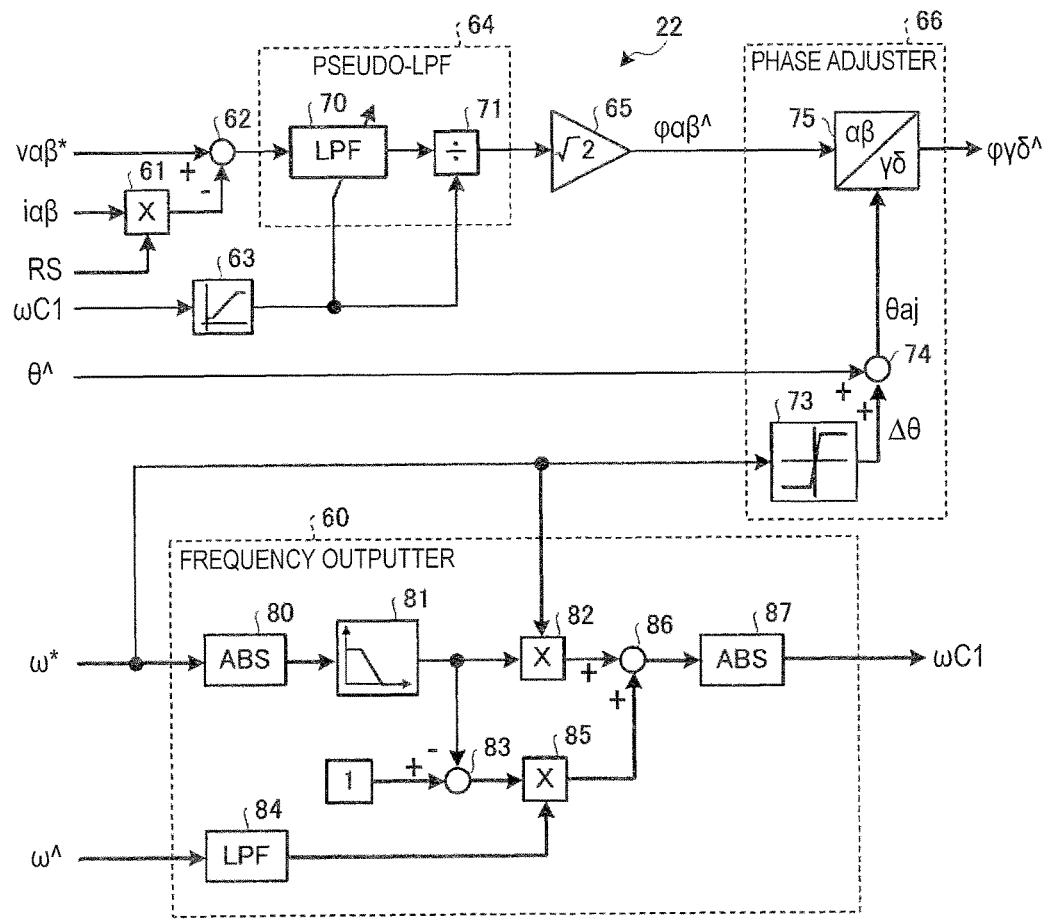
FIG. 5 is a view illustrating an example configuration of a magnetic flux estimator.

FIG. 5 is a view illustrating an example configuration of the magnetic flux estimator 22. As illustrated in FIG. 5, the magnetic flux estimator 22 includes a frequency outputter 60, a multiplier 61, a subtractor 62, a limiter 63, a pseudo-LPF 64, an amplifier 65, and a phase adjuster 66. Note that the amplifier 65 may be provided downstream of the phase adjuster 66, instead of upstream of the phase adjuster 66.

The frequency outputter 60 determines a cut-off frequency $\omega_C$ to be used by the pseudo-LPF 64. This frequency outputter 60 outputs a frequency $\omega_C 1$ according to a frequency $\omega_O$ of the output voltage $v_{UVW}$, i.e., a drive frequency of the electric motor 3 (hereinafter, referred to as "the drive frequency $\omega_O$"), based on the estimated velocity $\hat{\omega}$ and the command velocity $\omega^*$. Note that the configuration of the frequency outputter 60 will be described in detail later.

The multiplier 61 multiplies the detected current vector $i_{\alpha\beta}$ by the coil resistance $R_S$ of the stator 3a. The subtractor 62 subtracts the multiplied result of the multiplier 61 from the voltage command vector $v_{\alpha\beta}^*$. Thereby, differences $v_{\alpha df}$ and $v_{\beta df}$ between the output voltage $v_{UVW}$ and the voltage drop caused by the coil resistance $R_S$ of the electric motor 3 is calculated on the αβ-axes. Here, the differences $v_{\alpha df}$ and $v_{\beta df}$ can be expressed by the following formulas (6) and (7), for example.

$$v_{\alpha df} = v_\alpha^* - R_S \cdot i_\alpha \qquad (6)$$

$$v_{\beta df} = v_\beta^* - R_S \cdot i_\beta \qquad (7)$$

The limiter 63 limits the frequency $\omega_C 1$ outputted from the frequency outputter 60 so that the frequency $\omega_C 1$ does not exceed a predetermined upper limit (e.g., 100 Hz). Note that the magnetic flux estimator 22 may not be provided with the limiter 63.

The pseudo-LPF 64 includes a variable low-pass filter 70 and a divider 71. The variable low-pass filter 70 is a primary low-pass filter that can change the cut-off frequency $\omega_C$, for example. The variable low-pass filter 70 uses the frequency $\omega_C 1$ outputted from the limiter 63 as the cut-off frequency $\omega_C$, and applies a low-pass filter to the differences $v_{\alpha df}$ and $v_{\beta df}$. The divider 71 divides the output of the variable low-pass filter 70 by the frequency $\omega_C 1$.

Figure 6:
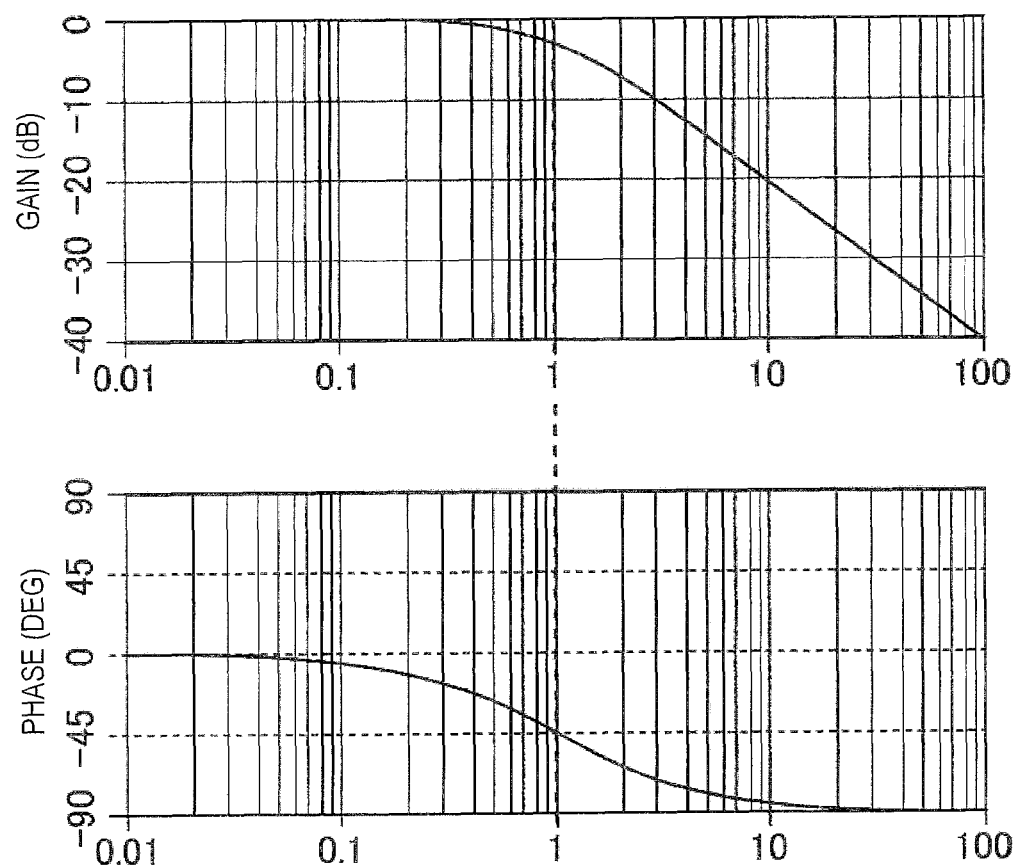
FIG. 6 illustrates graphs indicating characteristics of a variable low-pass filter when the cut-off frequency is 1 Hz.

FIG. 6 illustrates graphs illustrating characteristics of the variable low-pass filter 70 when the cut-off frequency $\omega_C$ is 1 Hz. As illustrated in FIG. 6, when a signal at the same frequency as the cut-off frequency $\omega_C$ is inputted, the variable low-pass filter 70 outputs a signal that is retarded in phase by 45 degrees, and reduced in amplitude by $1/\sqrt{2}$ times, with respect to the input.

An input frequency $\omega_i$ into the variable low-pass filter 70 is the frequency of the differences $v_{\alpha df}$ and $v_{\beta df}$, and is the same as the drive frequency $\omega_O$. Therefore, when the cut-off frequency $\omega_C$ is set at the same frequency as the drive frequency $\omega_O$, the output of the variable low-pass filter 70 is retarded in phase by 45 degrees and is $1/\sqrt{2}$ times in amplitude, with respect to the differences $v_{\alpha df}$ and $v_{\beta df}$.

Here, a case where integration is applied to the differences $v_{\alpha df}$ and $v_{\beta df}$ is considered. When the differences $v_{\alpha df}$ and $v_{\beta df}$ are inputted into the integrator, an output of the integrator is retarded in phase by 90 degrees and $1/\omega_O$ times in amplitude, with respect to the differences $v_{\alpha df}$ and $v_{\beta df}$. Therefore, compared with the output of the integrator, the output of the variable low-pass filter 70 is advanced in phase by 45 degrees and $\omega_O/\sqrt{2}$ times in amplitude.

Thus, the magnetic flux estimator 22 is provided with the divider 71 and the amplifier 65 in order to adjust the gain, and is provided with the phase adjuster 66 in order to adjust the phase.

The divider 71 divides the output of the variable low-pass filter 70 by the frequency 107 $_C$1. The frequency $\omega_C$1 is the same as the drive frequency $\omega_O$. Thereby, the output of the pseudo-LPF 64 is $1/\sqrt{2}$ times in amplitude, compared with the output of the integrator. The amplifier 65 multiplies the output of the pseudo-LPF 64 by $\sqrt{2}$.

The magnetic flux estimator 22 calculates an estimated value $\phi_{\alpha\beta}\hat{}$ (hereinafter and in the drawings, referred to as "the estimated stator magnetic flux $\phi_{\alpha\beta}\hat{}$") of the vector component $\phi_{\alpha\beta}$ of the stator magnetic flux $\phi_S$ in the $\alpha\beta$-axes coordinate system by adjusting the gain according to the output of the variable low-pass filter 70 as described above. Note that the estimated stator magnetic flux $\phi_{\alpha\beta}\hat{}$ is advanced in phase by 45 degrees with respect to the vector component $\phi_{\alpha\beta}$ of the stator magnetic flux $\phi_S$.

The phase adjuster 66 converts the components in the $\alpha\beta$ coordinate system into components in the $\gamma\delta$ coordinate system, while adjusting the estimated stator magnetic flux $\phi_{\alpha\beta}\hat{}$ so that the estimated stator magnetic flux $\phi_{\alpha\beta}\hat{}$ is retarded by 45 degrees. The phase adjuster 66 includes an adjuster 73, an adder 74, and a coordinate converter 75.

Figure 7:
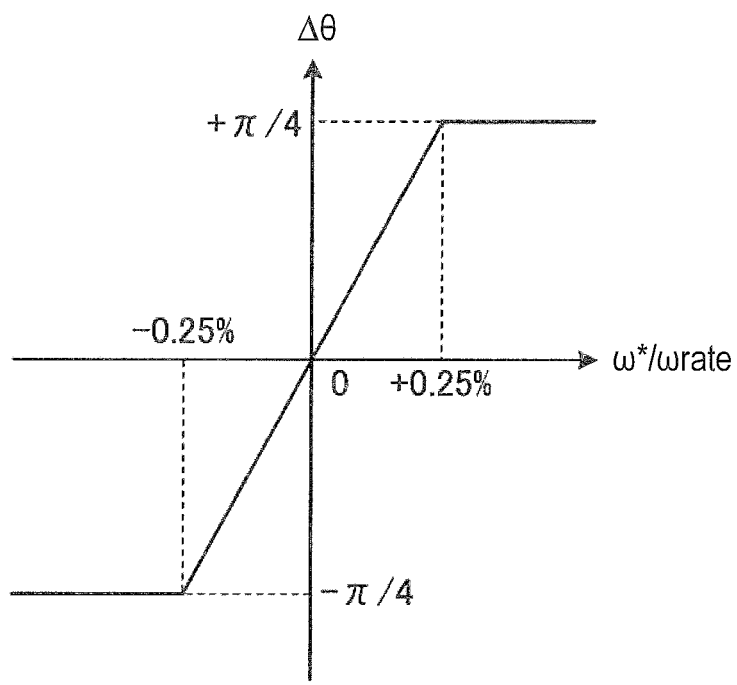
FIG. 7 is a graph illustrating a relation between a velocity command and a phase adjustment amount.

The adjuster 73 outputs a phase adjustment amount $\Delta\theta$ according to the velocity command $\omega^*$. FIG. 7 is a graph illustrating a relation between the velocity command $\omega^*$ and the phase adjustment amount $\Delta\theta$. The adjuster 73 stores a table or a formula having the relation illustrated in FIG. 7, and outputs a phase adjustment amount $\Delta\theta$ according to the velocity command $\omega^*$ based on the table or formula.

For example, the adjuster 73 sets the phase adjustment amount $\Delta\theta$ to $\pi/4$, if the velocity command $\omega^*$ is 0.25% or greater of a rated velocity $\omega_{rate}$ (e.g., 100 Hz) of the electric motor 3 at the time of power running. Further, for example, the adjuster 73 sets the phase adjustment amount $\Delta\theta$ to $-\pi/4$, if the velocity command $\omega^*$ is $-0.25\%$ or less of the rated velocity $\omega_{rate}$ at the time of regeneration. Further, for example, the adjuster 73 outputs the phase adjustment amount $\Delta\theta$ according to the magnitude of the velocity command $\omega^*$, if the velocity command $\omega^*$ is less than 0.25% of the rated velocity $\omega_{rate}$.

The adder 74 adds the phase adjustment amount $\Delta\theta$ to the estimated phase $\theta\hat{}$ to calculate an adjustment phase $\theta$aj. The coordinate converter 75 converts the estimated stator magnetic flux $\phi_{\alpha\beta}\hat{}$ in the $\alpha\beta$ coordinate system into a vector in the $\gamma\delta$-axes rotary coordinate system based on the adjustment phase $\theta$aj. Thus, the estimated stator magnetic flux $\phi_{\alpha\beta}\hat{}$ is adjusted to be retarded by 45 degrees, and the components in the $\alpha\beta$ coordinate system are converted into the components in the $\gamma\delta$ coordinate system.

As described above, the magnetic flux estimator 22 can obtain the estimated stator magnetic flux $\phi_{\gamma\delta}\hat{}$ similar to the estimated stator magnetic flux $\phi_{\gamma\delta}\hat{}$ which is obtained by integrating the differences $v_{\alpha df}$ and $v_{\beta df}$ with respect to time by the integrator, and converting the integrated result into the components in the $\gamma\delta$ coordinate system. In addition, since the integration is not performed, even if there is an offset error in the current detector 11, fluctuation at a frequency of multiplying the drive frequency $\omega_O$ by 1 is reduced to be included in the estimated stator magnetic flux $\phi_{\gamma\delta}\hat{}$. Thereby, the magnetic flux estimator 22 can reduce the offset occurring in the estimated stator magnetic flux $\phi_{\gamma\delta}\hat{}$.

The frequency outputter 60 outputs the frequency $\omega_C$1 according to the drive frequency $\omega_O$ based on the estimated velocity $\omega\hat{}$ and the command velocity $\omega^*$. The frequency outputter 60 outputs the velocity command $\omega^*$ when the velocity $\omega$ of the electric motor 3 is a predetermined first velocity $\omega$1 or less, and outputs the estimated velocity $\omega\hat{}$ when the velocity $\omega$ is a predetermined second velocity $\omega$2 or greater that is greater than the first velocity $\omega$1. Since the estimated velocity $\omega\hat{}$ may fluctuate when the velocity $\omega$ is small, the frequency outputter 60 outputs the velocity command $\omega^*$ when the velocity $\omega$ is the first velocity $\omega$1 or less.

Further, when the velocity $\omega$ of the electric motor 3 is greater than the first velocity $\omega$1 and smaller than the second velocity $\omega$2, a weighted addition is carried out for the velocity command $\omega^*$ and the estimated velocity $\omega\hat{}$ so that the weight of the estimated velocity $\omega\hat{}$ becomes greater than the weight of the velocity command $\omega^*$ as the velocity $\omega$ becomes greater, and the added result is then outputted. Thereby, the instantaneous switching of the frequency outputter 60 from the velocity command $\omega^*$ to the estimated velocity $\omega\hat{}$ is reduced.

As illustrated in FIG. 5, the frequency outputter 60 includes absolute value calculators 80 and 87, a regulator 81, multipliers 82 and 85, a subtractor 83, a low-pass filter (LPF) 84, and an adder 86. The absolute value calculator 80 calculates an absolute value of the velocity command $\omega^*$.

Figure 8:
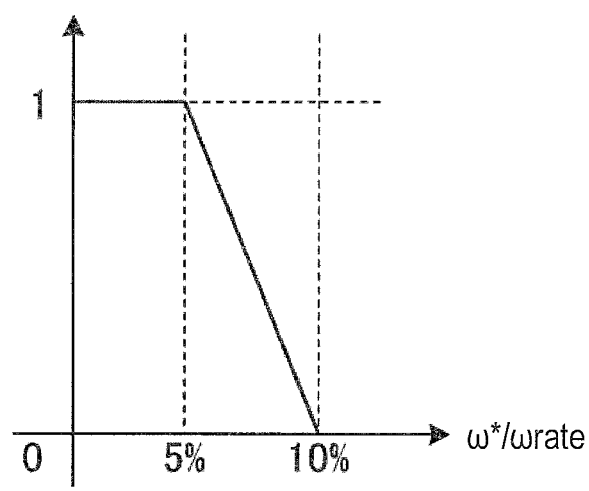
FIG. 8 is a graph illustrating one example of a relation between the velocity command and an output value.

FIG. 8 is a graph illustrating one example of a relation between the velocity command $\omega^*$ and the output values (the values of weight). In the example illustrated in FIG. 8, 5% of the rated velocity $\omega_{rate}$ is the first velocity $\omega$1, and 10% of the rated velocity $\omega_{rate}$ is the second velocity $\omega$2.

As illustrated in FIG. 8, the regulator 81 outputs 1 when the velocity command $\omega^*$ is less than 5% of the rated velocity $\omega_{rate}$, and outputs 0 when the velocity command $\omega^*$ is 10% or greater of the rated velocity $\omega_{rate}$. Further, the regulator 81 outputs a value according to the magnitude of the velocity command $\omega^*$ when the velocity command $\omega^*$ is greater than 5% of the rated velocity $\omega_{rate}$ and less than 10% of the rated velocity curate.

The multiplier 82 multiplies the output of the regulator 81 by the velocity command $\omega^*$. The subtractor 83 subtracts the output of the regulator 81 from 1. The low-pass filter 84 removes noise components of the estimated velocity $\omega\hat{}$. The multiplier 85 multiplies the output of the subtractor 83 by the output of the low-pass filter 84.

The adder 86 adds the multiplied result of the multiplier 82 to the multiplied result of the multiplier 85. The absolute value calculator 87 calculates an absolute value of the added result of the adder 86.

Thus, the frequency outputter 60 outputs as the frequency $\omega_C$1, a frequency that is same as the drive frequency $\omega_O$, based on the estimated velocity $\omega\hat{}$ and the command velocity $\omega^*$. Thereby, since the frequency same as the drive frequency $\omega_O$ is set to the pseudo-LPF 64 as the cut-off frequency $\omega_C$, the output of the pseudo-LPF 64 can be retarded by 45 degrees compared with the output of the integrator.

Figure 9:
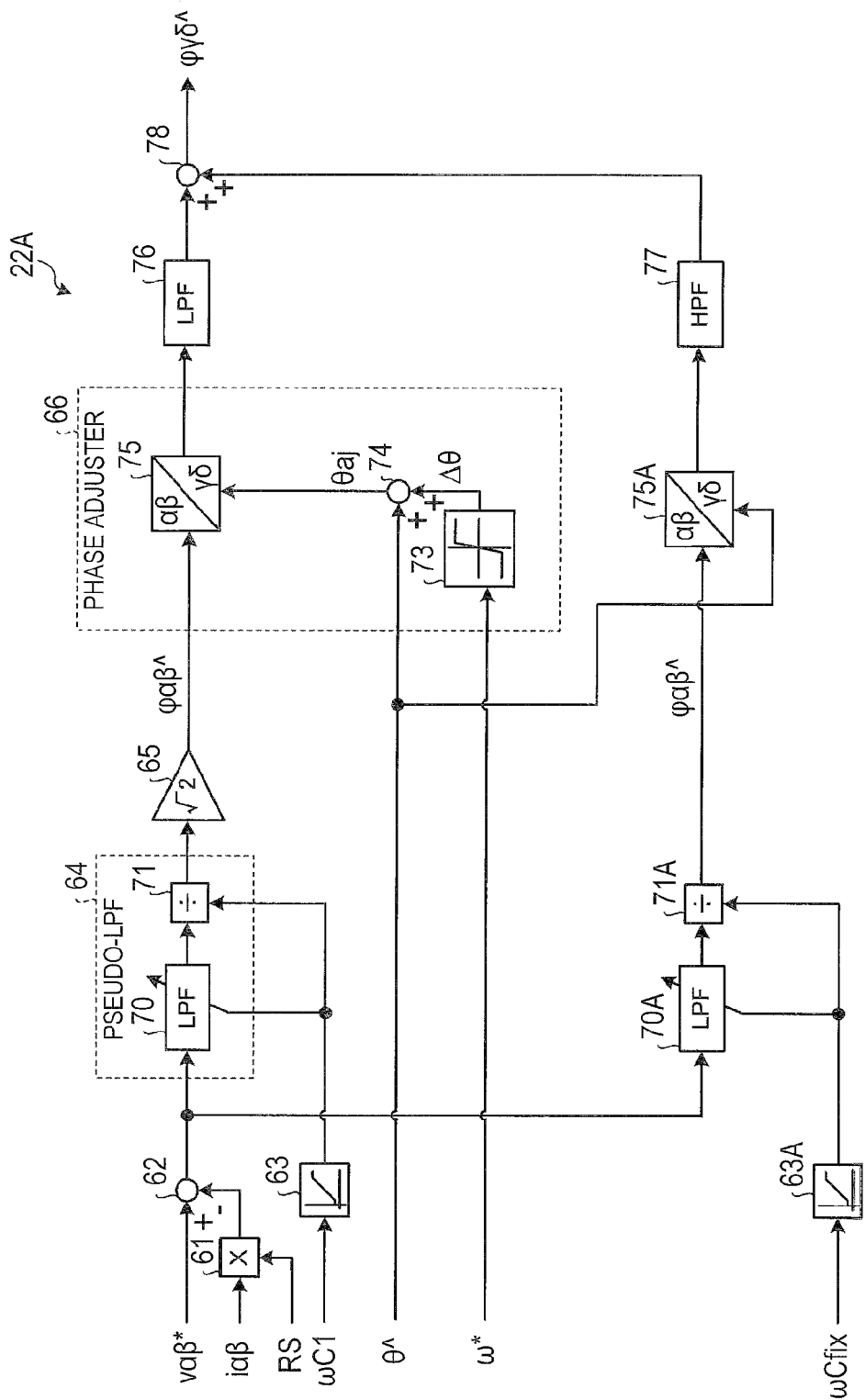
FIG. 9 is a view illustrating another example of the configuration of the magnetic flux estimator.

The magnetic flux estimator 22 is not limited to the configuration illustrated in FIG. 5. FIG. 9 is a view illustrating an example configuration of another magnetic flux estimator 22A. The magnetic flux estimator 22A illustrated in FIG. 9 calculates the estimated stator magnetic flux $\phi_{\gamma\delta}\hat{}$ from which fluctuation at a frequency obtained by multiplying the drive frequency $\omega_O$ by 6 (hereinafter, referred to as "6f") is reduced, in addition to the reduction of the fluctuation at the frequency obtained by multiplying the drive frequency $\omega_O$ by 1 (hereinafter, referred to as "1f").

The magnetic flux estimator 22A illustrated in FIG. 9 is further provided with a limiter 63A, low-pass filters (LPF) 70A and 76, a divider 71A, a coordinate converter 75A, a high-pass filter (HPF) 77, and an adder 78, in addition to the configuration of the magnetic flux estimator 22 illustrated in FIG. 5.

The limiter 63A limits a fixed frequency $\omega_{Cfix}$ (e.g., 1 Hz) so that the fixed frequency $\omega_{Cfix}$ does not exceed a predetermined upper limit (e.g., 100 Hz). Note that the magnetic flux estimator 22A may not be provided with the limiter 63A.

The low-pass filter 70A (one example of the fixed low-pass filter in the claims) uses the fixed frequency $\omega_{Cfix}$ as the cut-off frequency $\omega_C$ to apply a low-pass filter to the differences $v_{\alpha df}$ and $v_{\beta df}$. The divider 71A divides the output of the low-pass filter 70A by the fixed frequency $\omega_{Cfix}$ to calculate the estimated stator magnetic flux $\hat{\phi}_{\alpha\beta}$.

The coordinate converter 75A converts the estimated stator magnetic flux $\hat{\phi}_{\alpha\beta}$ in the $\alpha\beta$ coordinate system into a vector in the $\gamma\delta$-axes rotary coordinate system based on the estimated phase $\hat{\theta}$ to calculate the estimated stator magnetic flux $\hat{\phi}_{\gamma\delta}$. The output of the coordinate converter 75A is inputted into the high-pass filter 77. The high-pass filter 77 removes a component equal to or below the drive frequency $\omega_O$ from the estimated stator magnetic flux $\hat{\phi}_{\gamma\delta}$.

The output of the coordinate converter 75 of the phase adjuster 66 is also inputted into the low-pass filter 76. The low-pass filter 76 removes a frequency component higher than the drive frequency coo. The adder 78 (one example of the compensator in the claims) adds the output of the low-pass filter 76 to the output of the high-pass filter 77 to calculate the estimated stator magnetic flux $\hat{\phi}_{\gamma\delta}$.

Thus, the magnetic flux estimator 22A illustrated in FIG. 9 compensates based on the output of the low-pass filter 70A which is a fixed low-pass filter, the estimated stator magnetic flux $\hat{\phi}_{\gamma\delta}$ on the bases of the output of the phase adjuster 66. Thereby, the estimated stator magnetic flux $\hat{\phi}_{\gamma\delta}$ from which the 6f fluctuation component is reduced can be calculated, in addition to the 1f fluctuation component. Note that the 6f fluctuation component originates, for example, in a deadtime of switching of the power converter 10.

Figure 10:
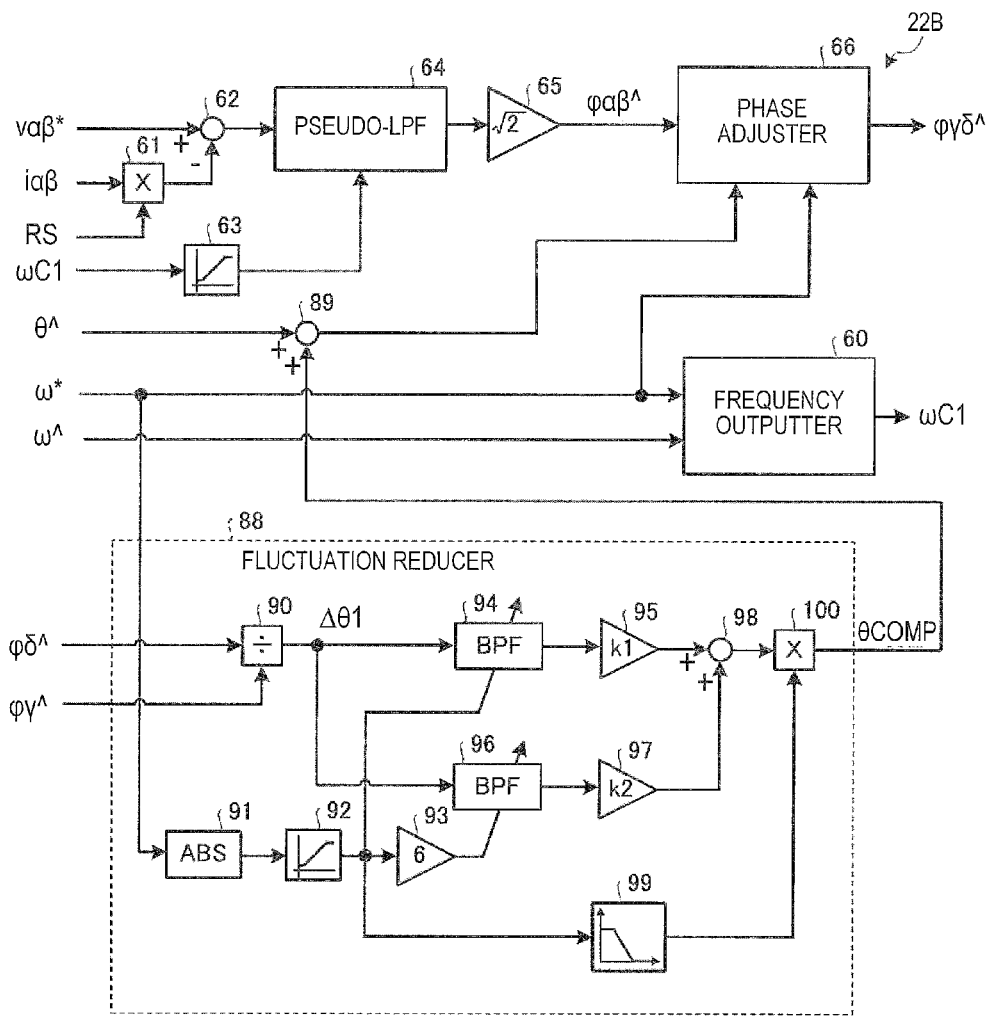
FIG. 10 is a view illustrating still another example of the configuration of the magnetic flux estimator.

FIG. 10 is a view illustrating a configuration of still another magnetic flux estimator 22B. The magnetic flux estimator 22B illustrated in FIG. 10 is further provided with a fluctuation reducer 88 and an adder 89, in addition to the configuration of the magnetic flux estimator 22 illustrated in FIG. 5.

The fluctuation reducer 88 generates a compensation phase $\theta_{COMP}$ for reducing the 1f fluctuation component and the 6f fluctuation component. The adder 89 adds the compensation phase $\theta_{COMP}$ to the estimated phase $\hat{\theta}$, and then outputs it to the phase adjuster 66. The phase adjuster 66 adds the phase adjustment amount $\Delta\theta$ to the estimated phase $\hat{\theta}$ to which the compensation phase $\theta_{COMP}$ is added to calculate the adjustment phase $\theta aj$. Thereby, the estimated stator magnetic flux $\hat{\phi}_{\gamma\delta}$ from which the 1f fluctuation component is further reduced and the 6f fluctuation component is reduced can be calculated.

The fluctuation reducer 88 includes a divider 90, an absolute value calculator 91, a limiter 92, amplifiers 93, 95 and 97, band-pass filters (BPF) 94 and 96, an adder 98, an adjuster 99, and a multiplier 100, for example.

The divider 90 calculates a phase error $\Delta\theta 1$ by dividing the $\delta$-axis estimated stator magnetic flux $\hat{\phi}_\delta$ by the $\gamma$-axis estimated stator magnetic flux $\hat{\phi}_\gamma$. The absolute value calculator 91 calculates an absolute value of the command velocity $\omega^*$. The limiter 92 limits the velocity command $\omega^*$ so that the velocity command $\omega^*$ does not exceed a predetermined upper limit (e.g., 100 Hz). Note that the magnetic flux estimator 22B may not be provided with the limiter 92.

The amplifier 93 multiplies the absolute value of the command velocity $\omega^*$ by 6, and sets the frequency that is six times of the command velocity $\omega^*$ as a center frequency fo of the band-pass filter 96. The band-pass filter 96 extracts the 6f component from the phase errors $\Delta\theta 1$. Further, the absolute value of the command velocity $\omega^*$ is inputted into the band-pass filter 94, and the absolute value of the command velocity $\omega^*$ is set as the center frequency fo of the band-pass filter 94. The band-pass filter 94 extracts the 1f component from the phase error $\Delta\theta 1$.

The amplifier 95 multiplies the output of the band-pass filter 94 by k1, and the amplifier 97 multiplies the output of the band-pass filter 96 by k2. The adder 98 adds the result of multiplying the 1f component of the phase error $\Delta\theta 1$ by k1 to the result of multiplying the 6f component of the phase error $\Delta\theta 1$ by k2. Note that since the 1f and 6f fluctuation components change depending on a proportional gain of the PI controller 42 (refer to FIG. 2), the gains k1 and k2 are set as gains, for example, according to the proportional gain of the PI controller 42 (e.g., 1.5 times of the proportional gain of the PI controller 42).

Figure 11:
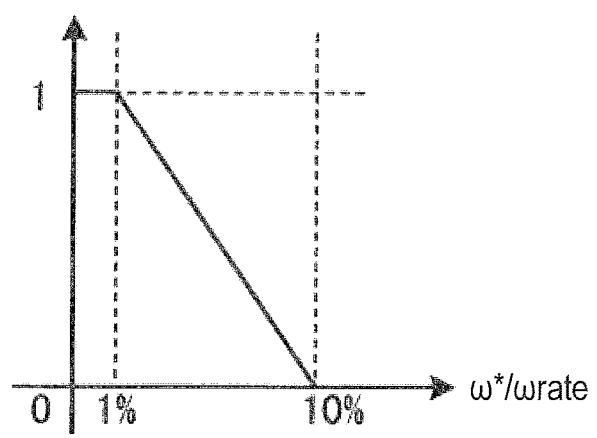
FIG. 11 is a graph illustrating one example of a relation between the velocity command and an output value of a regulator.

The adjuster 99 outputs a value according to the velocity command $\omega^*$. FIG. 11 is a graph illustrating one example of a relation between the velocity command $\omega^*$ and the output value of the adjuster 99. In the example illustrated in FIG. 11, the adjuster 99 outputs 1 when the velocity command $\omega^*$ is 1% or less of the rated velocity $\omega_{rate}$, and outputs 0 when the velocity command $\omega^*$ is 10% or greater of the rated velocity $\omega_{rate}$. Further, the adjuster 99 outputs a value according to the magnitude of the velocity command $\omega^*$ when the velocity command $\omega^*$ is greater than 1% and less than 10% of the rated velocity $\omega_{rate}$.

Since the 1f and 6f fluctuation components appear notably at low motor rotational speed, the magnetic flux estimator 22 illustrated in FIG. 11 switches valid/invalid of the fluctuation reducer 88 within a range of 1% to 10%. However, the fluctuation reducer 88 is not limited to the configuration illustrated in FIGS. 10 and 11.

4. Control Flow of Magnetic Flux Estimator 22

Figure 12:
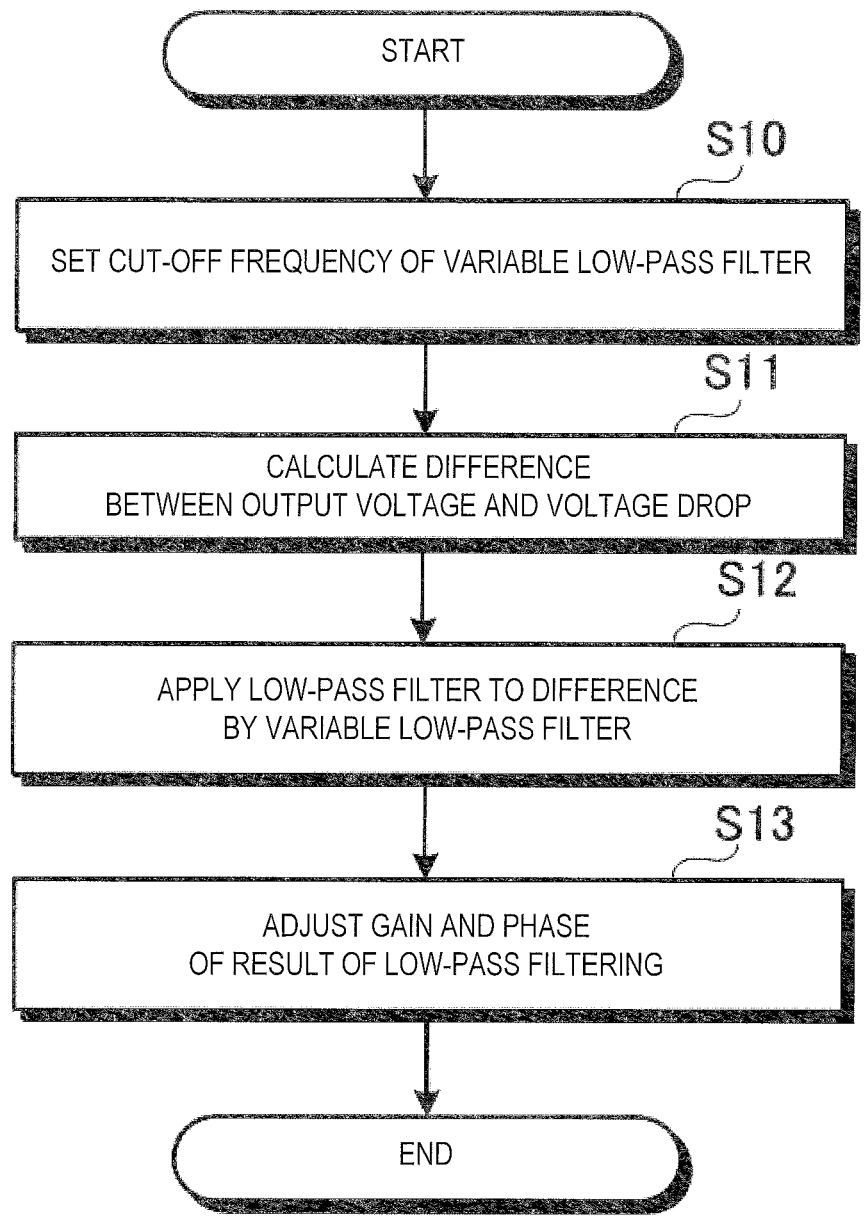
FIG. 12 is a flowchart illustrating an example flow of control processing of the magnetic flux estimator.

FIG. 12 is a flowchart illustrating an example flow of control processing of the magnetic flux estimators 22, 22A and 22B. Note that in this section, the magnetic flux estimators 22, 22A and 22B described above are comprehensively referred to as "the magnetic flux estimator 22," unless otherwise particularly described. The magnetic flux estimator 22 repeatedly executes the magnetic flux estimation processing illustrated in FIG. 12 at a predetermined period.

As illustrated in FIG. 12, the magnetic flux estimator 22 sets the frequency $\omega_{C1}$ according to the drive frequency $\omega_O$ of the electric motor 3 as the cut-off frequency we of the variable low-pass filter 70 (step S10).

The magnetic flux estimator 22 calculates the difference between the output voltage $v_{UVW}$ and the voltage drop caused by the coil resistance $R_S$ of the electric motor 3 (step S11). For example, the magnetic flux estimator 22 calculates the differences $v_{\alpha df}$ and $v_{\beta df}$ between the output voltage $v_{UVW}$ and the voltage drop caused by the coil resistance $R_S$ by subtracting the result of multiplying the detected current vector $i_{\alpha\beta}$ by the value of the coil resistance $R_S$ of the stator 3a from the voltage command vector $v_{\alpha\beta}^*$.

The magnetic flux estimator 22 applies the low-pass filter by the variable low-pass filter 70 to the difference between the output voltage $v_{UVW}$ and the voltage drop caused by the coil resistance $R_S$ of the electric motor 3 (step S12). For example, the magnetic flux estimator 22 applies the low-pass filter to the differences $v_{\alpha df}$ and $v_{62\ df}$ by the variable low-pass filter 70.

The magnetic flux estimator 22 obtains the vector of the stator magnetic flux $\phi_S$ by performing a gain adjustment and a phase adjustment to the result of the low-pass filtering by the variable low-pass filter 70 (step S13). For example, when a signal at a frequency same as the cut-off frequency $\omega_C$ is inputted, the magnetic flux estimator 22 obtains the estimated stator magnetic flux $\phi_{\gamma\delta}\hat{}$ by multiplying the output of the variable low-pass filter 70 by $\sqrt{2}/\omega_O$, and retarding the phase by 45 degrees.

Note that the magnetic flux estimator 22 described above uses the cut-off frequency $\omega_C$ of the variable low-pass filter 70 that is the same frequency as the drive frequency $\omega_O$; however, the cut-off frequency $\omega_C$ may be other frequencies according to the drive frequency $\omega_O$. For example, the magnetic flux estimator 22 may be configured to change the cut-off frequency $\omega_C$ according to the drive frequency $\omega_O$ so that the retard in the phase with respect to the output of the integrator becomes a predetermined value other than $\pi/4$ (e.g., $\pi/6$). In this case, the amplifier 65 of the magnetic flux estimator 22 amplifies the output of the pseudo-LPF 64 by a gain according to the retard in the phase with respect to the output of the integrator.

For example, the magnetic flux estimator 22 may store the frequency $\omega_C 1$ according to the drive frequency $\omega_O$ and the amount of gain adjustment in a table form, and adjust the cut-off frequency $\omega_C$ of the variable low-pass filter 70 and the gain of the amplifier 65 based on the table.

Further, the magnetic flux estimator 22 described above is configured to estimate the vector of the stator magnetic flux $\phi_S$ in the stationary coordinate system ($\alpha\beta$ coordinate system); however, the magnetic flux estimator 22 may be configured to estimate the vector of the stator magnetic flux $\phi_S$ in the rotary coordinate system ($\gamma\delta$ coordinate system).

Further, the magnetic flux estimator 22 may also add the voltage drop $\omega_O L i$ ($\omega_O L i_\gamma^*$, $\omega_O L i_\delta^*$) at an inductance L of the electric motor 3 to the voltage command vector $v_{\gamma\delta}$ ($v_\gamma^*$, $v_\delta^*$) outputted from the current controller 28, for example. By doing so, the magnetic flux estimator 22 can also calculate the difference between the output voltage $v_{UVW}$ and the voltage drop caused by the coil resistance $R_S$. In this case, the output of the amplifier 65 is the estimated stator magnetic flux $\phi_{\gamma\delta}\hat{}$.

Further, the magnetic flux estimator 22 described above is provided with the phase adjuster 66 downstream of the pseudo-LPF 64; however, the phase adjuster 66 may be provided upstream of the pseudo-LPF 64. Further, the magnetic flux estimator 22 described above performs the phase adjustment and the coordinate conversion at the phase adjuster 66. However, the phase adjuster for adjusting the phase may be separated from the coordinate converter for converting the coordinates, and in this case, the phase adjuster, the pseudo-LPF 64, and the coordinate converter can be arranged in this order, for example.

Further, the magnetic flux estimator 22 described above is configured to perform the gain adjustment. However, since the phase/velocity estimator 23 calculates the estimated phase $\theta\hat{}$ and the estimated velocity $\omega\hat{}$ based on the phase of the vector of the stator magnetic flux $\phi_S$, the phase/velocity estimator 23 can calculate the estimated phase $\theta\hat{}$ and the estimated velocity $\omega\hat{}$ based on the output of the magnetic flux estimator 22 even when the magnetic flux estimator 22 does not perform the gain adjustment. In this case, the amplifier 65 may not be provided to the magnetic flux estimator 22, for example.

Note that the arrows illustrated in FIGS. 1 to 5, 9 and 10 auxiliarily indicate flow directions of information (e.g., data and signals) and controls, and they are neither intended to deny other flows nor intended to limit the directions.

The controller 12 may include one or more microcomputers and/or various kinds of circuits having one or more Central Processing Units (CPUs), one or more Read Only Memories (ROMs), one or more Random Access Memories (RAMs), and/or one ore more input/output ports. The CPU of the microcomputer can achieve the controls of the components 20 to 35 described above by reading and executing the program(s) stored in the ROM(s).

Further, any one or some or all of the components 20 to 35 described above may also be constructed with hardware, such as Application Specific Integrated Circuit (ASIC) and/or Field Programmable Gate Array (FPGA).

Further effects and modifications may easily be derived by a person skilled in the art. Thus, broader aspects of the present invention should not be limited by the specific detailed description and the representative embodiments illustrated and described above. Therefore, the aspects may be variously changed without departing from the comprehensive spirit or scope of the present invention defined by the appended claims and their equivalents.

What is claimed is:

1. A motor control device, comprising:
    a power converter for applying output voltage according to a voltage command to an electric motor;
    a magnetic flux estimator for estimating a vector of stator magnetic flux of the electric motor based on a difference between the output voltage and a voltage drop caused by a coil resistance of the electric motor; and
    a phase estimator for estimating a phase of the stator magnetic flux based on the vector of the stator magnetic flux estimated by the magnetic flux estimator,
    wherein the magnetic flux estimator includes:
        a variable low-pass filter for applying a low-pass filter to the difference at a cut-off frequency according to a frequency of the output voltage; and
        a phase adjuster for retarding at least one of an output phase of the variable low-pass filter and a phase of the difference before inputted into the variable low-pass filter.

2. The motor control device of claim 1, wherein the variable low-pass filter sets the frequency of the output voltage as the cut-off frequency, while the phase adjuster retards at least one of the output phase and the phase of the difference by $\pi/4$.

3. The motor control device of claim 1, further comprising:
    a velocity estimator for estimating velocity of the electric motor based on the vector of the stator magnetic flux estimated by the magnetic flux estimator;
    a velocity controller for generating a torque command so that the estimated velocity is in agreement with a velocity command; and
    an outputter for outputting the velocity command when the velocity of the electric motor is less than a predetermined first velocity, and outputting the estimated velocity when the velocity of the electric motor is greater than a predetermined second velocity that is greater than the first velocity,
    wherein the variable low-pass filter sets a frequency according to the output of the outputter as the cut-off frequency.

4. The motor control device of claim 3, wherein the outputter sums the velocity command and the estimated velocity with weights when the velocity of the electric motor is greater than the first velocity and smaller than the second velocity, and outputs the added result, the weight of the estimated velocity being greater than the weight of the velocity command according to an increase in the velocity of the electric motor.

5. The motor control device of claim 1, wherein the magnetic flux estimator includes:
   a fixed low-pass filter for applying a low-pass filter to the difference at a fixed cut-off frequency; and
   a compensator for compensating based on an output of the fixed low-pass filter, the estimated value of the vector of the stator magnetic flux based on an output of the phase adjuster.

6. The motor control device of claim 1, further comprising:
   a current distributor for calculating based on a torque command, a component that contributes to a mechanical output of the electric motor as a δ-axis current command and a component that does not contribute to the mechanical output as a γ-axis current command;
   a current detector for detecting current flowing into the electric motor;
   a converter for converting the detected current of the current detector into δ-axis current and γ-axis current based on the phase of the stator magnetic flux estimated by the phase estimator; and
   a current controller for generating a δ-axis voltage command and a γ-axis voltage command as the voltage commands so that a difference between the δ-axis current command and the δ-axis current and a difference between the γ-axis current command and the γ-axis current become zero, respectively,
   wherein the phase estimator estimates the phase of the stator magnetic flux so that a δ-axis component of the vector of the stator magnetic flux estimated by the magnetic flux estimator becomes zero.

7. The motor control device of claim 6, further comprising:
   a converter for converting the detected current of the current detector into an α-axis component and a γ-axis component in a stationary coordinate system; and
   a converter for converting the voltage command into an α-axis component and a β-axis component in the stationary coordinate system,
   wherein the magnetic flux estimator estimates the vector of the stator magnetic flux based on the coil resistance, the α-axis component and the β-axis component of the detected current, and the α-axis component and the γ-axis component of the voltage command.

8. A magnetic flux estimating device of an electric motor, comprising:
   a variable low-pass filter for applying a low-pass filter to a difference between an applied voltage to the electric motor and a voltage drop caused by a coil resistance of the electric motor at a cut-off frequency according to a frequency of the applied voltage; and
   a phase adjuster for retarding at least one of an output phase of the variable low-pass filter and a phase of the difference before inputted into the variable low-pass filter.

9. A method of estimating a magnetic flux of an electric motor, comprising:
   applying a low-pass filter to a difference between an applied voltage to the electric motor and a voltage drop caused by a coil resistance of the electric motor at a cut-off frequency according to a frequency of the applied voltage; and
   retarding at least one of a phase of the difference after the low-pass filter is applied and a phase of the difference before the low-pass filter is applied.

* * * * *